(12) United States Patent
Song et al.

(10) Patent No.: US 9,420,281 B2
(45) Date of Patent: Aug. 16, 2016

(54) METHOD AND APPARATUS FOR ENCODING/DECODING VIDEO USING HIGH-PRECISION FILTER

(71) Applicant: SK TELECOM CO., LTD., Seoul (KR)

(72) Inventors: Jinhan Song, Seoul (KR); Jeongyeon Lim, Seongnam-si (KR); Yunglyul Lee, Seoul (KR); Joohee Moon, Seoul (KR); Haekwang Kim, Seoul (KR); Byeungwoo Jeon, Seongnam-si (KR); Jongki Han, Seoul (KR); Jeong Pil Kim, Seoul (KR); Daeyeon Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 701 days.

(21) Appl. No.: 13/857,708

(22) Filed: Apr. 5, 2013

(65) Prior Publication Data

US 2013/0223522 A1 Aug. 29, 2013

Related U.S. Application Data

(63) Continuation of application No. PCT/KR2011/007418, filed on Oct. 6, 2011.

(30) Foreign Application Priority Data

Oct. 6, 2010 (KR) .................. 10-2010-0097547
Jul. 21, 2011 (KR) .................. 10-2011-0072196

(51) Int. Cl.
*H04N 19/126* (2014.01)
*H04N 19/523* (2014.01)

(52) U.S. Cl.
CPC ....... *H04N 19/00096* (2013.01); *H04N 19/523* (2014.11)

(58) Field of Classification Search
CPC  H04N 19/00096; H04N 19/523; H04N 19/50
See application file for complete search history.

(56) References Cited

U.S. PATENT DOCUMENTS

| 2006/0203910 A1* | 9/2006 | Kitada | H04N 19/159 |
| | | | 375/240.12 |
| 2008/0095236 A1* | 4/2008 | Kim | H04N 19/51 |
| | | | 375/240.13 |
| 2008/0175322 A1* | 7/2008 | Lee | H04N 19/523 |
| | | | 375/240.16 |

FOREIGN PATENT DOCUMENTS

| KR | 1020100030119 | 3/2010 |
| WO | 2004/015999 | 2/2004 |
| WO | 2010/044569 | 4/2010 |

OTHER PUBLICATIONS

International Search Report for PCT/KR2011/007418.

*Primary Examiner* — Mohammed Rahaman
(74) *Attorney, Agent, or Firm* — Hauptman Ham, LLP

(57) ABSTRACT

Disclosed is a video encoding apparatus. The video encoding apparatus includes a prediction unit for generating a prediction block based on interpolating sub-samples of a reference block referenced by a motion vector of a current block. The video encoding apparatus further includes a subtraction unit for generating a residual block based on subtracting the prediction block from the current block and a transform unit for generating a frequency-transformed block based on transforming the residual block. The video encoding apparatus further includes a quantization unit for generating a quantized frequency-transformed block based on quantizing the frequency-transformed block and an encoding unit for encoding the quantized frequency-transformed block into a bitstream.

8 Claims, 10 Drawing Sheets

<4x4 Block of Current Frame>  <Reference Block : Vector (1, 0)>

<Reference Block : Vector (0.5, 0.25)>

METHOD AND APPARATUS FOR ENCODING/DECODING VIDEO USING HIGH-PRECISION FILTER

CROSS REFERENCE TO RELATED APPLICATIONS

The instant application is a continuation application of PCT/KR2011/007418 filed Oct. 6, 2011, which claims priority to Korean Patent Application No. 10-2010-0097547, filed on Oct. 6, 2010, and Korean Patent Application No. 10-2011-0072196, filed on Jul. 21, 2011, the entire contents of which are incorporated herein by reference.

TECHNICAL FIELD

The present disclosure relates to a method and an apparatus for encoding/decoding video using a high-precision filter.

BACKGROUND

The statements in this section merely provide background information related to the present disclosure and are not admitted as prior art.

Moving Picture Experts Group (MPEG) and Video Coding Experts Group (VCEG) have developed a new standard of video compression technology that is superior to the existing MPEG-4 Part 2 and H.263 standards. The new standard is called H.264/AVC (Advanced Video Coding) and was jointly announced as MPEG-4 Part 10 AVC and ITU-T Recommendation H.264. H.264/AVC (hereinafter, simply referred to as H.264) has significantly improved picture quality and performance by using various encoding methods. In addition, new standardization for higher picture quality than high-definition (HD) is under discussion by Joint Collaborative Team on Video Coding, the joint team of MPEG and VCEG.

As the existing moving picture encoding methods, an intra prediction encoding method and an inter prediction encoding method have been used. The intra prediction encoding method predicts a block by using a prediction value from a block encoded within a frame being currently encoded. The inter prediction encoding method predicts a block of a current frame by estimating a motion from a previously reconstructed frame.

In the intra prediction method for a luma signal, an intra 4×4 prediction, intra 16×16 prediction and intra 8×8 prediction have been used according to a prediction direction and the size of a block to be encoded.

FIG. 1 is a diagram of nine 4×4 intra prediction modes.

Referring to FIG. 1, the intra 4×4 prediction includes nine prediction modes: a vertical mode, a horizontal mode, a direct current (DC) mode, a diagonal down-left mode, a diagonal down-right mode, a vertical-right mode, a horizontal-down mode, a vertical-left mode and a horizontal-up mode.

FIG. 2 is a diagram of four 16×16 intra prediction modes.

Referring to FIG. 2, the intra 16×16 intra prediction includes four prediction modes: a vertical mode, a horizontal mode, a DC mode and a plane mode. Similarly to the intra 16×16 prediction, the intra 8×8 prediction also includes four prediction modes.

In an inter prediction method (inter predictive coding) for a video having a 4:2:0 video format, motion compensation has been used. Specifically, a video frame is divided, and a current block is predicted by estimating a motion from a previously encoded frame. If the block size of motion compensation is reduced for use, a current block can be predicted with higher accuracy. However, the requirement to encode motion vector information for each block results in an increase in the amount of code being encoded. In addition, when the motion compensation is performed, a more accurate motion vector is obtained by looking into not only motion vectors in integer samples having integer pixels but also in sub-samples having a ¼ sample resolution with respect to a luma component and a ⅛ sample resolution with respect to a chroma component. However, since luma and chroma samples of sub-sample positions do not exist within a reference picture, generating these values by interpolating neighboring samples in the reference picture is necessary.

SUMMARY

One aspect of this description relates to a video encoding apparatus. The video encoding apparatus includes a prediction unit for generating a prediction block based on interpolating sub-samples of a reference block referenced by a motion vector of a current block. The video encoding apparatus further includes a subtraction unit for generating a residual block based on subtracting the prediction block from the current block and a transform unit for generating a frequency-transformed block based on transforming the residual block. The video encoding apparatus further includes a quantization unit for generating a quantized frequency-transformed block based on quantizing the frequency-transformed block and an encoding unit for encoding the quantized frequency-transformed block into a bitstream.

Another aspect of this description relates to a video decoding apparatus. The video decoding apparatus includes a decoding unit for extracting a quantized frequency-transformed block from a bitstream and an inverse quantization unit for reconstructing a frequency-transformed block based on inversely quantizing the quantized frequency-transformed block. The video decoding apparatus further includes an inverse transform unit for reconstructing a residual block based on inversely transforming the frequency-transformed block and a prediction unit for generating a prediction block based on interpolating sub-sample values of a reference block referenced by a motion vector of a current block. The video decoding apparatus further includes an addition unit for reconstructing the current block based on adding the reconstructed residual block and the prediction block.

Another aspect of this description relates to a video decoding method. The video decoding method includes performing a decoding process for generating a quantized frequency-transformed block from a bitstream and performing an inverse quantization process for reconstructing a frequency-transformed block by inversely quantizing the quantized frequency-transformed block. The video decoding method further includes performing an inverse transform process for reconstructing a residual block by inversely transforming the frequency-transformed block and performing a prediction process for generating a prediction block from a value obtained based on interpolating sub-sample values of a reference block referenced by a motion vector of a current block. The video decoding method further includes performing an addition process for reconstructing the current block by adding a reconstructed residual block and the prediction block.

DETAILED DESCRIPTION

The embodiments of the present disclosure are directed to improve video compression efficiency by using a high-precision filter more accurate than linear interpolation during video interpolation and improve subjective picture quality by effectively reconstructing a video.

A video encoding apparatus and a video decoding apparatus according to one or more embodiments, as described below, is a user terminal, such as a personal computer (PC), a notebook computer, a personal digital assistant (PDA), a portable multimedia player (PMP), a PlayStation Portable (PSP), or a wireless communication terminal, a smart phone, or the like, or a server terminal, such as an application server and a service server, and refer to a variety of apparatuses equipped with, for example, a communication device, such as a communication modem for performing communications between various devices or wired/wireless communication networks, a memory for storing various programs for encoding or decoding videos or performing inter or intra prediction for encoding or decoding, and relevant data, and a microprocessor for executing the programs to perform operations and controls.

In addition, the video encoded into a bitstream by the video encoding apparatus is transmitted in real time or non-real-time to the video decoding apparatus for decoding the same where the video is reconstructed and reproduced after being transmitted via a wired/wireless communication network including Internet, a wireless short range or personal area network, wireless LAN network, WiBro (aka WiMax) network, mobile communication network, or communication interface such as a cable or universal serial bus (USB).

In general, a moving picture is composed of a series of pictures, each of which may be divided into predetermined areas, such as frames or blocks. When a picture is divided into blocks, the divided blocks are largely classified into intra blocks and inter blocks according to the encoding method. The intra block refers to a block encoded by an intra prediction coding method. The intra prediction encoding is a method that generates a prediction block by predicting pixels of a current block by using pixels of blocks reconstructed by being previously encoded and decoded within a current picture being currently encoded, and encodes a difference value from the pixels of the current block. The inter block refers to a block encoded by an inter prediction coding. The inter prediction coding is a method that generates a prediction block by predicting a current block in a current picture with reference to one or more previous pictures or next pictures, and encodes a difference value from the current block. A frame referenced for encoding or decoding the current picture is referred to as a reference frame.

Figure 1:
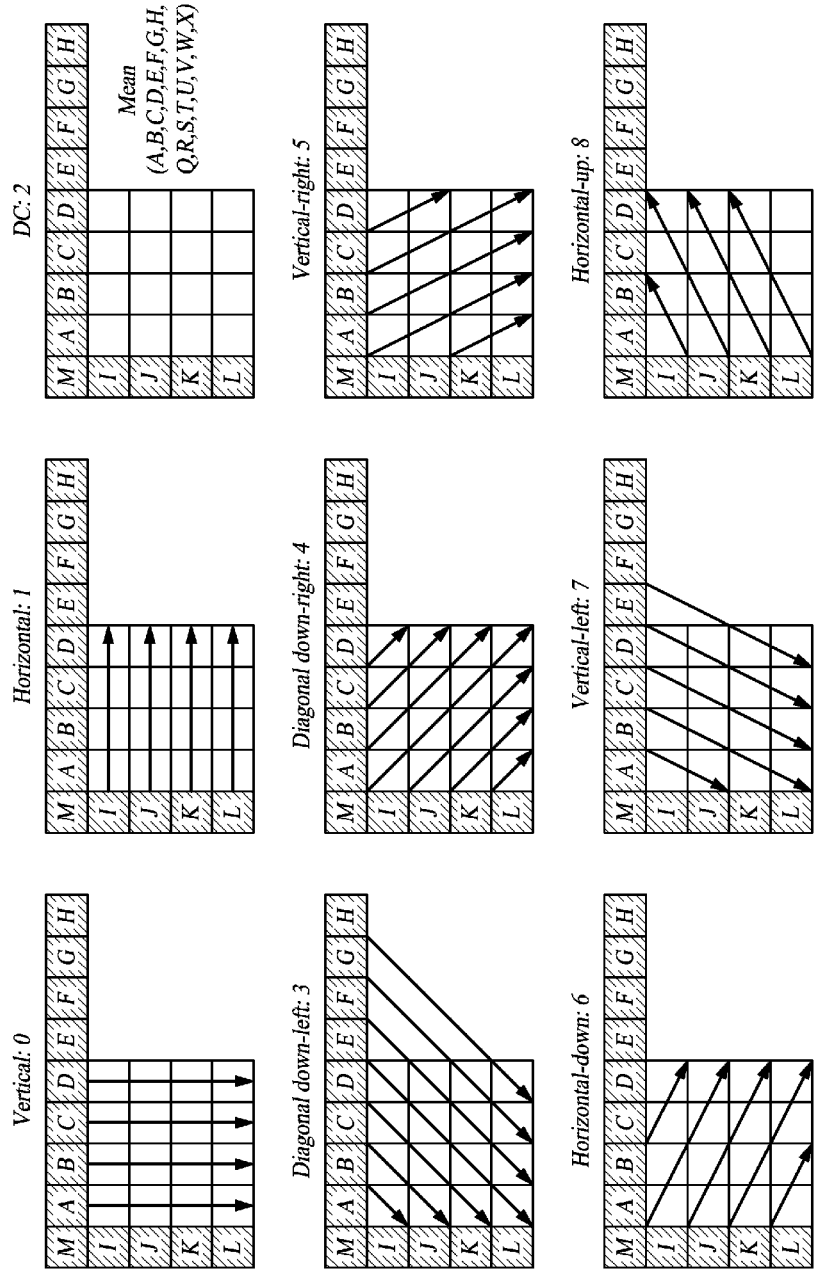
FIG. 1 is a diagram of nine 4×4 intra prediction modes.
Figure 2:
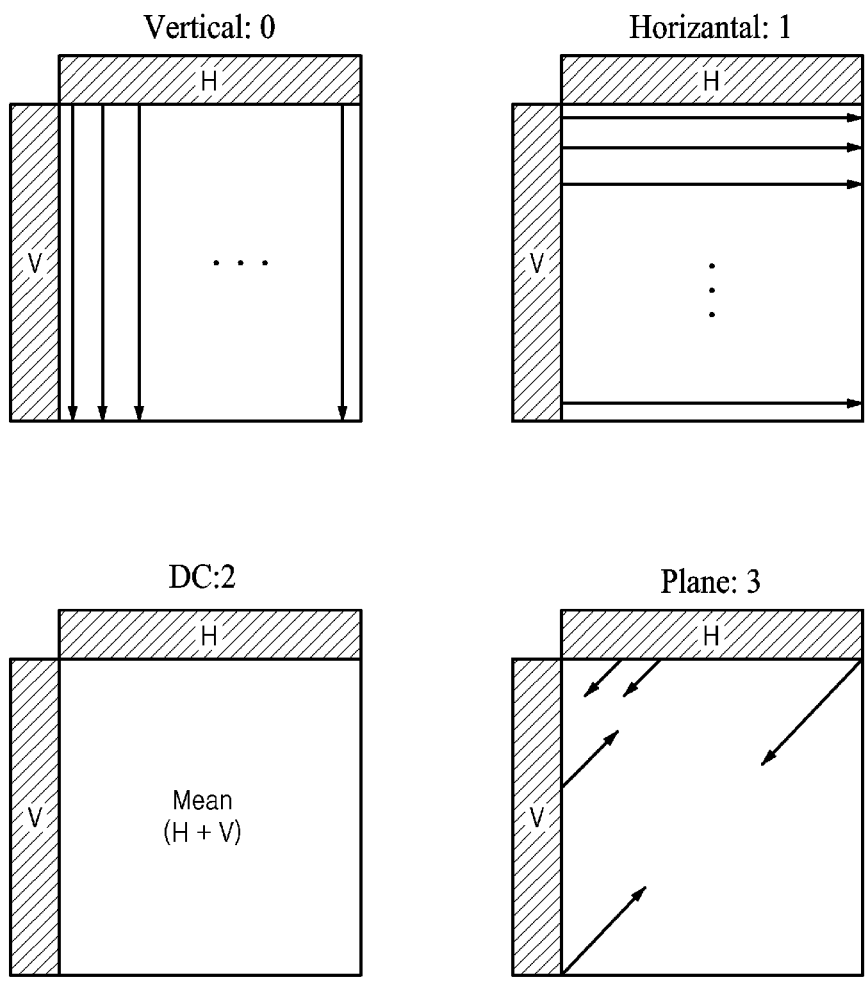
FIG. 2 is a diagram of four 16×16 intra prediction modes.
Figure 3:
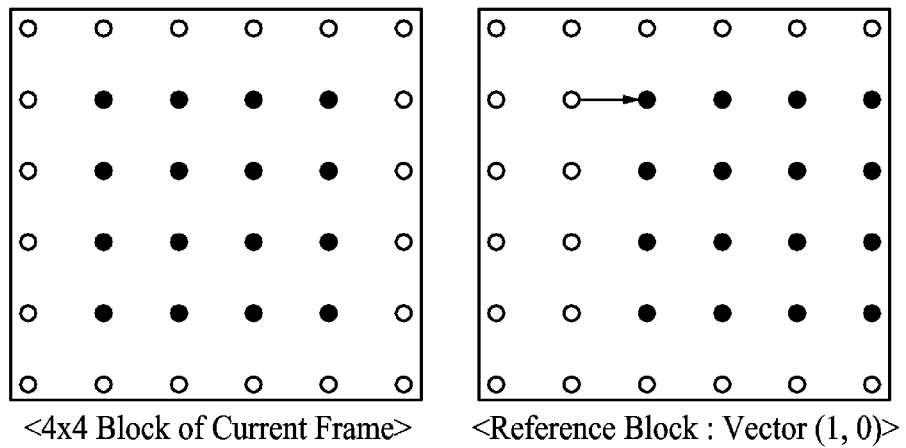
FIG. 3 is a diagram of a motion prediction using a sub-sample in a luma component.
Figure 3:
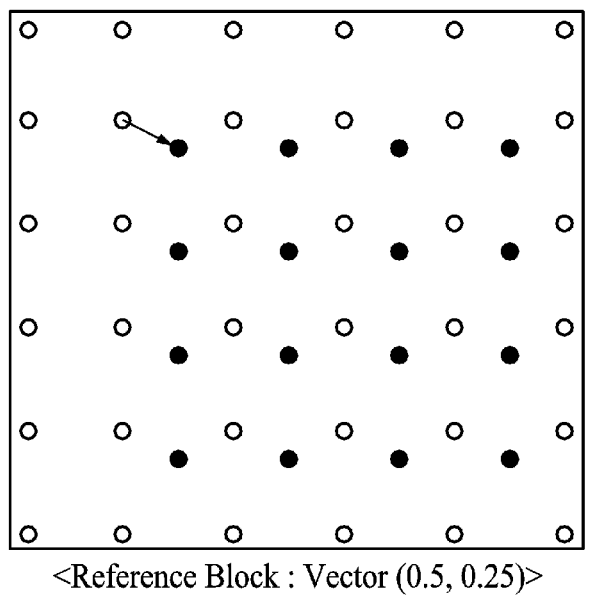

FIG. 3 is a diagram of a motion prediction using a sub-sample in a luma component.

Referring to FIG. 3, a motion vector is obtained up to a sub-sample position of a ¼ sample in an integer sample unit.

Figure 4:
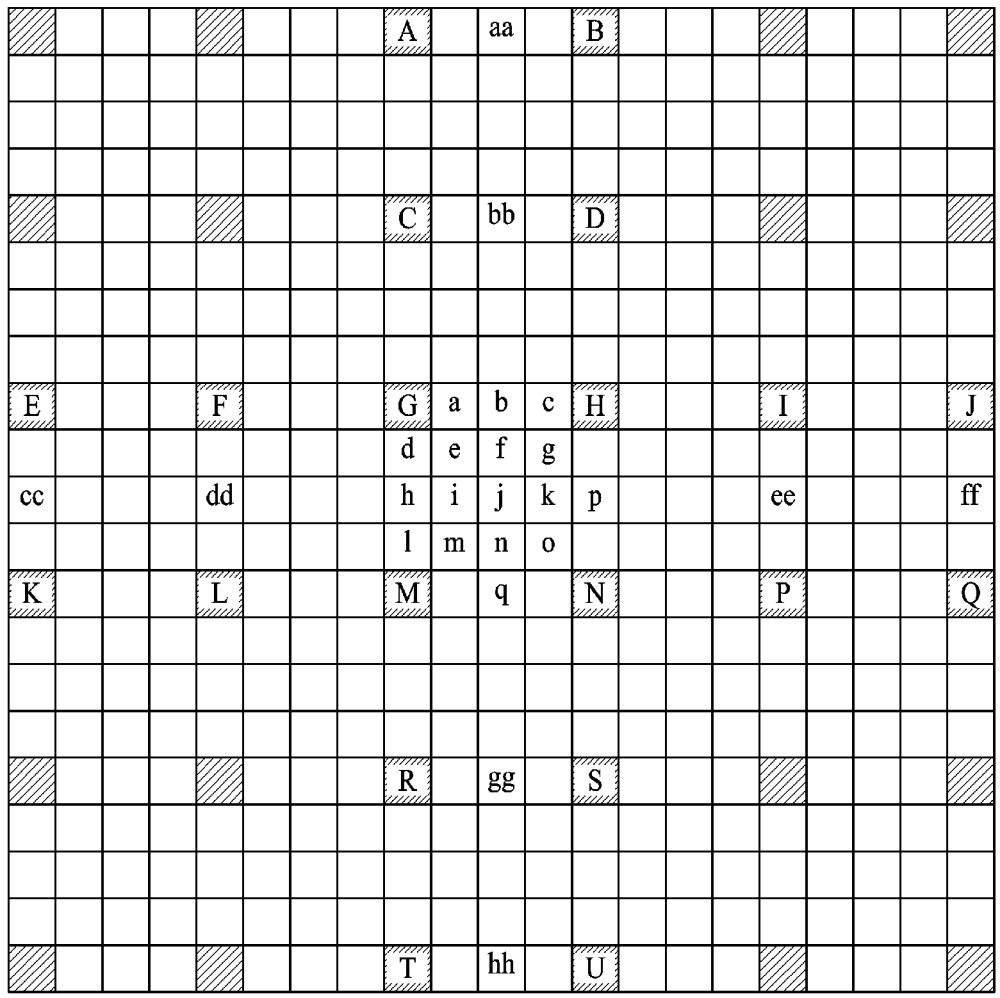
FIG. 4 is an example of a 6-tap finite impulse response (FIR) filter.

FIG. 4 is an example of a 6-tap finite impulse response (FIR) filter.

Referring to FIG. 4, a pixel value at the ½ sample position is interpolated by using values of six integer-pixels, i.e. pixels at integer position, and six filter coefficients {1, −5, 20, 20, −5, 1}, and the ¼ sample component is interpolated by linear interpolation using the interpolated ½ sample pixel value and integer pixel values or two ½ sample pixel values. The pixel value of a ¼ sample position is interpolated as shown in the following exemplary equation.

$$b'=(1\times E+(-5)\times F+20\times G+20\times H+(-5)\times I+1\times J)$$

$$b=b'/32$$

$$a=((32\times G)+b')/64 \quad \text{(Equation)}$$

The sub-samples can be more accurately interpolated, and different or modified filter coefficients may be used for that purpose. Referring to the above equation, when interpolating a ½ sample value, an adjusted ½ sample value, b' of the above equation, is first calculated by multiplying integer-pixel values by integer numerators of the filter coefficients, followed by summation thereof. The adjusted ½ sample value is calculated without division operation and the ½ sample value is finally derived just by dividing the adjusted ½-sample value by a common denominator of the filter coefficients, 32. As such, the filter coefficients are applied to integer pixels in an order of the integer numerators and the common denominator. The adjusted ½ sample value is used for linearly interpolating a ¼ sample, instead of the ½ sample value itself. The linearly interpolated ¼ sample equals to a mean value of the ½-sample and a integer-pixel near to the ¼ sample, G of the above equation. So the integer-pixel value G is multiplied by the common denominator of the ½ sample coefficients, 32, and then the sum of these two values, b' and 32*G of the above equation is divided by 64, twice the common denominator. In this way, an error caused by a division operation in the mid-course is avoided and more accurate sub-sample values can be calculated.

Figure 5:
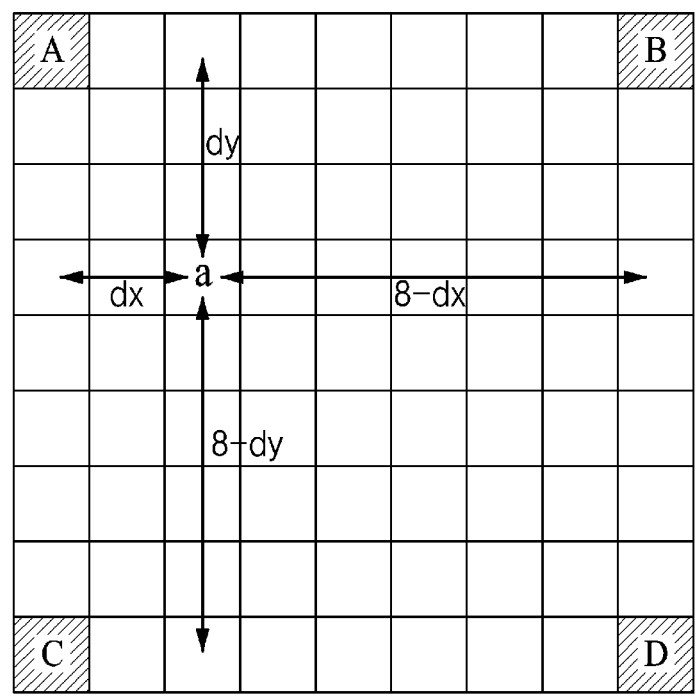
FIG. 5 is an example of linear interpolation of a chroma sample.

FIG. 5 is an example of linear interpolation of a chroma sample.

Referring to FIG. 5, as shown in the following exemplary equation, bi-linear interpolation using four integer pixel values is performed to interpolate a pixel value of a ⅛ sub-sample by multiplying weight values in consideration of the position of each sub sample.

$$a=[(8-dx)\times(8-dy)\times A+dx\times(8-dy)\times B+(8-dx)\times dy\times C+dx\times dy\times D)]/64. \quad \text{(Equation):}$$

That is, in the example of FIG. 5, $$\{a=[(6\times 5\times A)+(2\times 5\times B)+(6\times 3\times C)+(2\times 3\times D)]/64\}$$

The ⅛ sub-sample interpolation is performed because the chroma signal is ¼ times (horizontal: ½, vertical: ½) the resolution of the luma signal in the case of a 4:2:0 video format.

In this manner, when the chroma sample is interpolated with up to a ⅛ sample resolution by using only linear interpolation, the chroma sample is not as accurate as compared with a 6-tap FIR filter. Therefore, when the chroma sample is encoded, compression efficiency is lowered.

Figure 6:
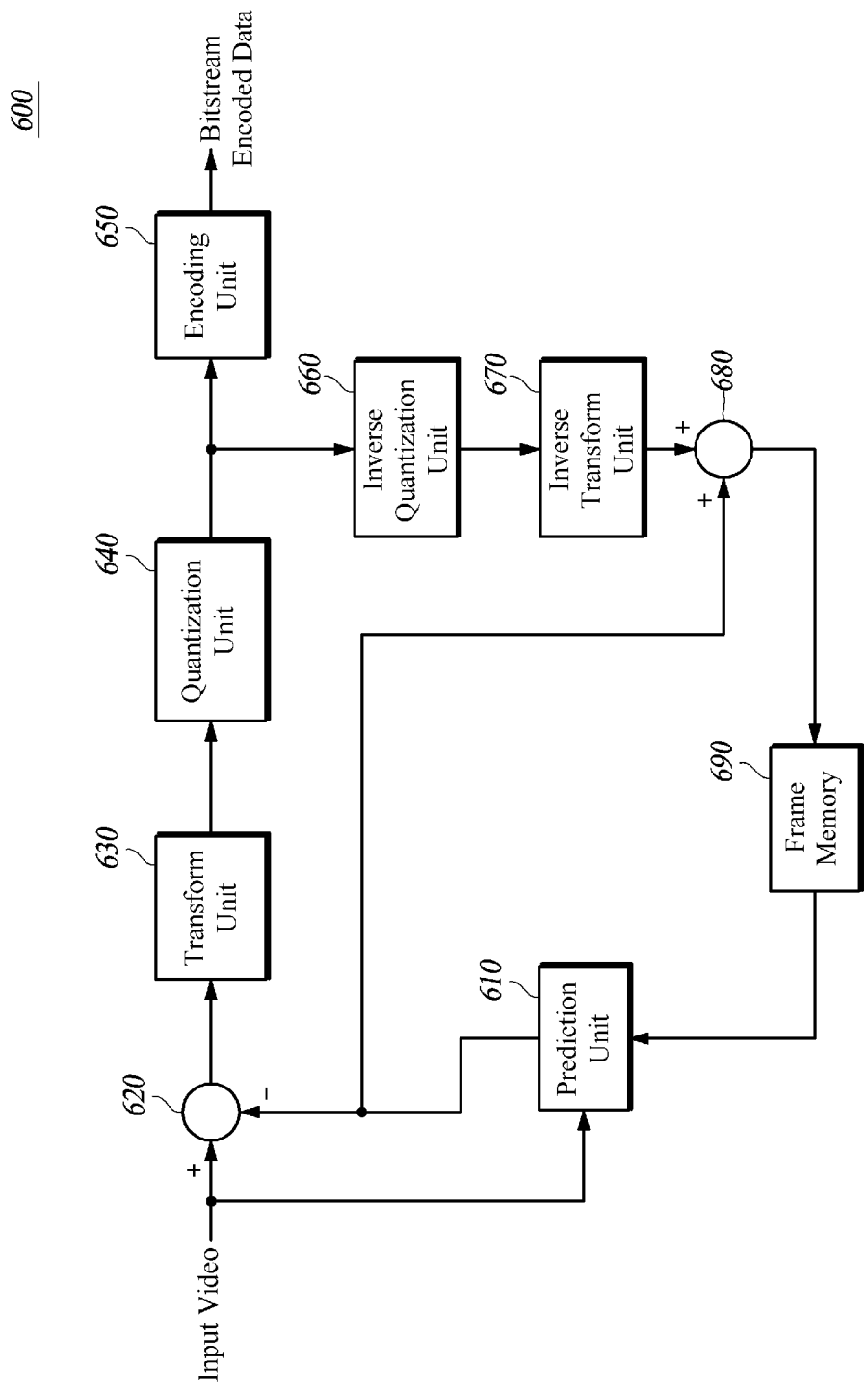
FIG. 6 is a block diagram of a video encoding apparatus according to at least one embodiment of the present disclosure.

FIG. 6 is a block diagram of a video encoding apparatus according to at least one embodiment of the present disclosure.

The video encoding apparatus 600 according to one or more embodiments of the present disclosure encodes a current block of a video by generating a sub-sample prediction value of a chroma component with the use of a motion vector value of a luma component. As shown in FIG. 6, the video encoding apparatus 600 includes a prediction unit 610, a subtraction unit 620, a transform unit 630, a quantization unit 640 and an encoding unit 650.

An input video to be encoded is input in units of macro blocks. In at least one embodiment, the macro block has an M×N form, wherein each of M and N has a magnitude of $2^n$ and are equal to or different from each other.

The prediction unit 610 generates a prediction block of a chroma component from a value obtained by interpolating a sub-sample component value of a chroma component of a reference block which is referenced by a motion vector of a chroma component of a current block, by using an FIR filter and linear interpolation.

The prediction unit 610 generates a prediction block by using another frame so as to predict a current macro block, in some embodiments. That is, the prediction unit 610 generates a motion vector through a motion estimation in a reconstructed previous frame having already undergone an encoding process, and generates a prediction block in a motion compensation process using the motion vector. In this case, the prediction unit 610 uses the same motion vector value in the chroma component by using the motion vector value of the luma component, and generates a prediction block having a prediction value obtained by interpolating a sub-sample component value of a reference frame which is indicated by the motion vector, by using an FIR filter and linear interpolation, in some embodiments.

The subtraction unit 620 generates a residual signal by calculating a difference between an original pixel value of each pixel of a current block and a prediction value generated by the prediction unit 610.

The transform unit 630 transforms the residual signal generated by the subtraction unit 620 into a frequency domain. The transform unit 630 transforms the residual signal into the frequency domain by using various transform techniques for transforming a time-axis video signal into a frequency axis, such as a discrete cosine transform (DCT) transform or a wavelet transform, in some embodiments.

The quantization unit 640 quantizes a frequency-transformed block including the residual signal transformed into the frequency domain by the transform unit 630. As the quantization method, a variety of quantization methods are used, in some embodiments. Examples of the quantization methods include a Dead Zone Uniform Threshold Quantization (DZUTQ) and a Quantization Weighted Matrix.

The encoding unit 650 encodes the quantized frequency-transformed block which is composed of frequency coefficients quantized by the quantization unit 640, into a bitstream. An entropy encoding technology is used for the encoding purpose, in some embodiments, though the present disclosure is not limited thereto, and a variety of other encoding technologies are used.

In addition, the encoding unit 650 includes a bitstream obtained by encoding quantization frequency coefficients and variety of information which is necessary for decoding the encoded bitstream, into encoded data. That is, the encoded data has a field which includes a bitstream obtained by encoding a coded block pattern (CBP), a delta quantization parameter, and a quantization frequency coefficient and another field which includes bits for information necessary for prediction (for example, intra prediction mode in the case of intra prediction, or motion vector in the case of inter prediction), in some embodiments.

The inverse quantization unit 660 inversely quantizes the transformed and quantized residual block (that is, quantized frequency-transformed block), and the inverse transform unit 670 inversely transforms the inversely-quantized and transformed residual block. In this manner, the residual block is reconstructed. The inverse quantization and the inverse transform are performed by inversely performing the transform and quantization processes which are respectively performed by the transform unit 630 and the quantization unit 640. That is, the inverse quantization unit 660 and the inverse transform unit 670 perform the inverse quantization and the inverse transform by using information about the transform/quantization (for example, information about transform/quantization types), which is generated and transmitted from the transform unit 630 and the quantization unit 640.

The addition unit 680 generates a reconstructed block by adding the prediction block generated by the prediction unit 610 and the residual block generated by the inverse transform unit 670.

The frame memory 690 stores the block reconstructed by the addition unit 680 and uses the reconstructed block as the reference block so as to generate the prediction block during the intra or inter prediction.

Figure 7:
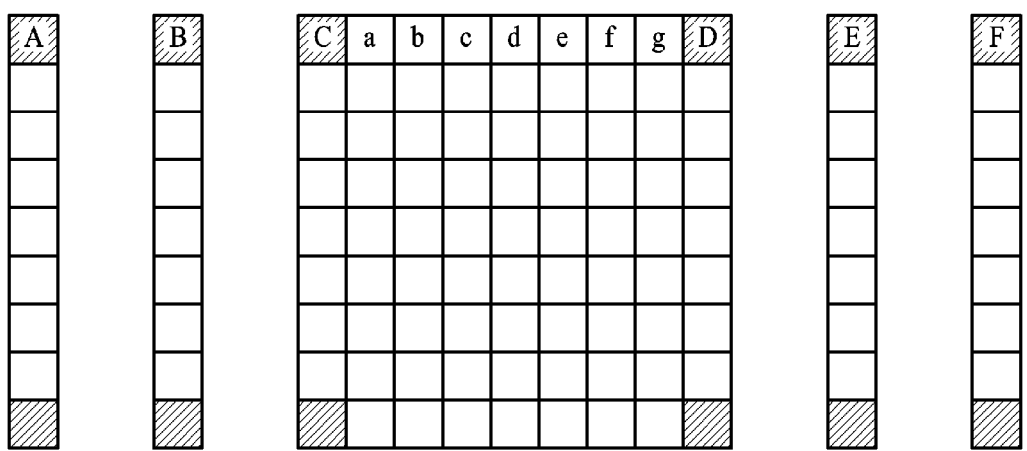
FIG. 7 is a diagram of a process of interpolating sub-sample values within a block by a prediction unit according to at least one embodiment of the present disclosure.

FIG. 7 is an exemplary diagram of a process of interpolating a sub-sample value within a block by the prediction unit 610 according to at least one embodiment of the present disclosure.

The interpolation of the sub-sample shown in FIG. 7 is performed by using the methods of Equations 1 to 4 below, in some embodiments.

$$d'=(1\times A+(-5)\times B+20\times C+20\times D+(-5)\times E+1\times F)$$

$$d=d'/32 \qquad \text{Equation 1}$$

The ½ sub-sample value is obtained by using a ½ sample amplification value obtained by multiplying adjacent integer pixel values by a predetermined value and adding the multiplication values.

The ½ sub-sample value is obtained by using left-side three integer pixel values A, B and C and right-side integer pixel values D, E and F.

$$b'=(32\times C)+d'$$

$$b=((32\times C)+d')/64 \qquad \text{Equation 2}$$

The ¼ sub-sample value is obtained by using the closest integer pixel value C and the ½ sample amplification value d'. "b" is obtained by division after linearly interpolating the closest integer pixel value C and the ½ sample amplification value d', instead of directly interpolating the ½ sub-sample. Therefore, an error occurring when obtaining "d" is removed.

$$a'=(64\times C)+b'$$

$$a=((64\times C)+b')/128 \qquad \text{Equation 3}$$

b' is obtained by using the closest integer pixel value C and the ½ sample amplification value d', in some embodiments. Therefore, the ⅛ sub-sample value is obtained by using the closest integer pixel value C and the ½ sample amplification value d', in some embodiments.

$$a=((w1\times(C\times32)+w2\times d')/((w1+w2)*32) \qquad \text{Equation 4}$$

In Equations 1, 2, 3 and 4 and FIGS. 7, A, B, C, D, E and F represent integer pixel values of the chroma component, and d, b, and a represent ½ sub-sample of the chroma component, ¼ sub-sample of the chroma component, and ⅛ sub-sample of the chroma component, respectively.

As shown in Equation 1, the ½ sub-sample value of the chroma component is generated by using a high-precision filter (herein, the high-precision filter may use various filters, such as an FIR filter). As shown in Equation 2, the ¼ sub-sample value uses the high-precision filter and the linear interpolation. In particular, in the case of the ⅛ sub-sample, as shown in Equation 3, the high-precision linear interpolation is performed by using the integer pixel and the ¼ sub-sample. In addition, as shown in Equation 4, the high-precision linear interpolation is performed by using the integer pixel and the ½ sub-sample. In this case, w1 and w2 represent weight values to be multiplied by the integer pixel and the ½ sub-sample. The ½ sub-sample value (for example, 'd') using Equation 1 and the ¼ sub-sample value (for example, 'b') using Equation 2 are generated by using the high-precision FIR filter. The ⅛ sub-sample value (for example, 'a') using Equation 3 is generated through the linear interpolation between two pixel values. Therefore, more accurate values can be generated as compared with the case where all sub-samples are interpolated by using the linear interpolation alone.

All division operations used in Equations 1 to 5 improve the processing speed by using a bit shift operation (>>, <<), in some embodiments.

In addition, for rounding off to the nearest integer in Equations 1 to 4, half the divisor may be added in advance to the dividend. Equation 5 below is an equation in which the round-off operation is added to Equation 3.

$$a=((64 \times C)+b'+64)/128 \qquad \text{Equation 5}$$

The FIR filter is a type of a digital filter and performs filtering with only predetermined values of input signals. Therefore, if calculating an impulse response, which is a characteristic function of a filter, the FIR filter has a finite length. In addition, in the equation of the FIR filter, the FIR has no feedback component. Therefore, when implementing the same characteristic, order is increased and execution time is increased. However, the FIR filter is used when a phase shift (that is, maintenance of waveform between input and output) is important, in some embodiments.

In addition, in the high-precision FIR filter used herein, the ½ sub-sample is generated by using an FIR filter, and the ¼ sub-sample, as shown in Equation 2, is generated not by using the ½ sub-sample value (d in Equation 1) obtained by dividing a value (d') using the FIR filter by 32, but by linearly interpolating a value (32×C) obtained by multiplying an integer pixel value by 32 and a value before the division by 32 (that is, an FIR filtering result value d' obtained when the ½ sub-sample value is obtained). Therefore, information loss due to the division operation in the midcourse is prevented, thereby interpolating a value more accurately.

In addition, all sub-sample values, such as d' of Equation 1, b' of Equation 2, and a' of Equation 3, and the integer pixel values, in which a bit is increased to have the same bit number as the sub-sample value, is used as sample values when obtaining a prediction block of a current block in the next step. After obtaining the prediction block, the pixel values are divided by the weight value, such that a bit number per sample of the prediction block becomes equal to a bit number per sample of the current block. Therefore, higher performance is exhibited.

In addition, Equation 4 has been described as an equation for calculating only the interpolated value of a (⅛ sub-sample). However, even in the case of obtaining b (¼ sub-sample), b is obtained by setting the weight values w1 and w2 differently from the case of obtaining a, in some embodiments. In a similar manner, f is obtained if using f' instead of b', f instead of b, and D instead of C in Equation 2, and g is obtained if using g instead of a', g instead of a, f' instead of b', f instead of b, and D instead of C in Equation 3. Meanwhile, c which is ⅛ sub-sample is obtained by interpolating b and d, and e is obtained by interpolating d and f. Therefore, similarly to a or g, c and e is obtained by using the closest integer pixel value C and ½ sample amplification value d'.

As such, ½ sub-sample is obtained by obtaining the adjacent integer pixel values. Finer sub-sample values (¼ sub-sample, ⅛ sub-sample, or the like) are interpolated by using less finer adjacent sub-sample values or close integer pixel values (that is, ½ sub-sample and integer pixel are used when calculating ¼ sample value), in some embodiments. The use of sub-sample values or integer pixel values so as to interpolate sub-samples located at various positions can be derived by a person having ordinary skill in the art even though the case of all sub-samples is not described.

In addition, interpolation methods other than the high-precision FIR filter and linear interpolation used herein are used, in some embodiments. However, it is important to use the FIR filter with 6 or more taps for ½ sample, and to perform the interpolation to have the high-precision function, as shown in Equation 2, for ¼ sample.

In the case of a 4:2:0 video format, the reference block within the reference frame is interpolated by using Equations 1 to 3. In the case of a 4:4:4 video format, the luma component and the chroma component within the reference block are equal in resolution. Therefore, like the luma component, the chroma component has only to be interpolated up to ¼ sample position. Therefore, if the interpolation of ⅛ sample position in Equation 3 is omitted, in some embodiments, the interpolation is used in the 4:4:4 video format.

In addition, in the case of a 4:2:2 video format, the chroma component of a horizontal direction is ½ times the resolution of the luma component. Therefore, the sub-sample is generated by interpolating the chroma component of the horizontal direction up to ⅛ sub-sample like Equations 1 to 3, and interpolating the chroma component of a vertical direction up to ¼ sub-sample by using Equations 1 and 2 like the 4:4:4 video format.

In addition, in Test Model under Consideration (TMuC) for image picture of the existing HD or higher, the luma component is interpolated up to ⅛ sub-sample, in some embodiments. Therefore, in the 4:2:0 video format, the chroma component is interpolated up to ¹⁄₁₆ sub-sample, in some embodiments. Therefore, at the most, the ⅛ sub-position is made in the above-described embodiment of the present disclosure, and the ¹⁄₁₆ sub-sample position is interpolated again by using the linear interpolation.

Meanwhile, in the foregoing embodiment, the filtering and interpolation methods have been described while taking the chroma component as an example, but these methods are also applied to various blocks, such as luma component and blocks of R, G and B colors, as well as the chroma component. In a decoding method which is to be described below, the filtering and interpolation methods are equally applied to chroma component, luma component, and various blocks, such as blocks of R, G and B colors.

Figure 8:
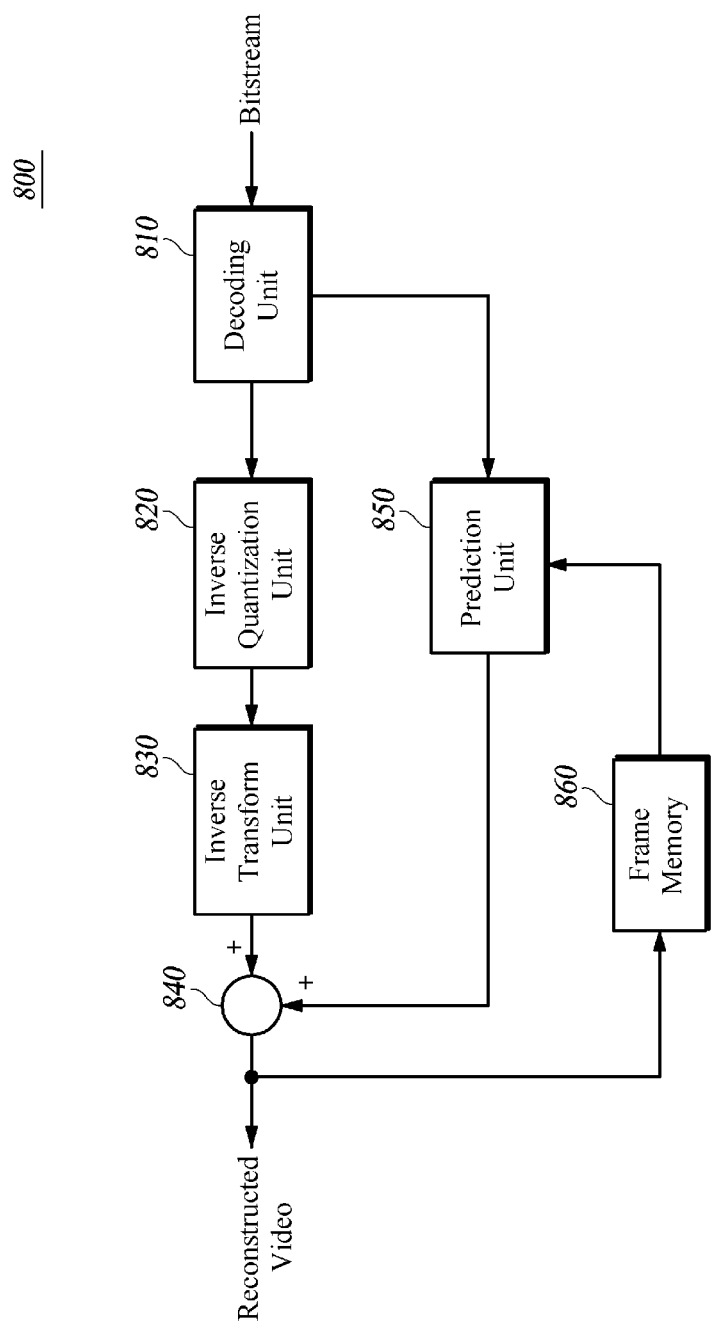
FIG. 8 is a block diagram of a configuration of a video decoding apparatus according to at least one embodiment of the present disclosure.

FIG. 8 is a block diagram of a configuration of a video decoding apparatus according to at least one embodiment of the present disclosure.

As shown in FIG. 8, a video decoding apparatus 800 according to one or more embodiments of the present disclosure decodes a current block of a video by generating a sub-sample prediction value of a chroma component by using a motion vector value of a luma component. The video decoding apparatus 800 includes a decoding unit 810, an inverse quantization unit 820, an inverse transform unit 830, an addition unit 840, and a prediction unit 850.

The decoding unit 810 extracts a quantized frequency-transformed block by decoding a bitstream.

The decoding unit 810 decodes or extracts pieces of information necessary for decoding, as well as the quantized frequency block, by decoding encoded data. The pieces of information necessary for decoding refer to pieces of information necessary for decoding an encoded bitstream within the encoded data. For example, the pieces of information necessary for decoding are information about block type, information about motion vector, information about transform/quantization type, and other various pieces of information.

That is, the decoding unit 810 extracts a quantized frequency-transformed block, including pixel information of a current block of a video, by decoding a bitstream which is data encoded by the video encoding apparatus 600, and transfers extracted information necessary for prediction to the prediction unit 850.

The prediction unit 850 predicts the current block by using the information necessary for prediction, which is transferred from the decoding unit 810, in the same manner as in the prediction unit 610 of the video encoding apparatus 600.

The prediction unit 850 generates a prediction block of a chroma component from a value obtaining by interpolating a sub-sample value of a chroma component of a reference block which is referenced by a motion vector of a chroma component of a current block, by using an FIR filter and linear interpolation. When obtaining the motion vector of the chroma component of the current block, by using a motion vector of a luma component reconstructed from a bitstream, a prediction value is generated from an integer pixel value of a chroma component of a reference block which is referenced by the motion vector, by using a high-precision FIR filter and linear interpolation.

The prediction unit 850 of the video decoding apparatus 800 according to one or more embodiments of the present disclosure generates a sub-sample in the same manner as in the prediction unit 610 of the video encoding apparatus 600 described above with reference to FIG. 6. Therefore, detailed description thereof will be omitted for avoiding redundant description.

The inverse quantization unit 820 inversely quantizes the quantized frequency-transformed block extracted from the bitstream by the decoding unit 810. The inverse transform unit 830 inversely transforms the frequency-transformed block which is inversely quantized by the inverse quantization unit 820, into time domain.

The addition unit 840 reconstructs an original pixel value of the current block by adding the pixel value generated by the prediction unit 850 and a residual signal reconstructed by the inverse transform of the inverse transform unit 830. The current block reconstructed by the addition unit 840 is transferred to a frame memory 860, and is used to predict other blocks in the prediction unit 850, in some embodiments.

The frame memory 860 stores the reconstructed video and enables the generation of intra prediction blocks and inter prediction blocks.

The video encoding/decoding apparatus according to an embodiment of the present disclosure is configured by connecting a bitstream output terminal of the video encoding apparatus 600 of FIG. 6 to a bitstream input terminal of the video decoding apparatus 800 of FIG. 8.

The video encoding/decoding apparatus according to at least one embodiment of the present disclosure includes a video encoder for generating a prediction block of a chroma component from a value obtained by interpolating a sub-sample value of a chroma component of a reference block which is referenced by a motion vector of a luma component of a current block, by using an FIR filter and linear interpolation. The video encoder is further for generating a residual block by subtracting the prediction block from the chroma component of the current block, and generating a quantized frequency-transformed block by transforming and quantizing the residual block. The video encoder is further for encoding the quantized frequency-transformed block into a bitstream. The video encoding/decoding apparatus further includes a video decoder for generating a quantized frequency-transformed block from a bitstream, and reconstructing a residual block by inversely quantizing and inversely transforming the quantized frequency-transformed block. The video decoder further for generating a prediction block of a chroma component from a value obtained by interpolating a sub-sample value of a chroma component of a reference block which is referenced by a motion vector of a chroma component of a current block to be reconstructed, by using an FIR filter and linear interpolation, and reconstructing the current block by adding the reconstructed residual block and the generated prediction block.

The video encoder is implemented with the video encoding apparatus 600 according to one or more embodiments of the present disclosure, and the video decoder is implemented with the video decoding apparatus 600 according to one or more embodiments.

Figure 9:
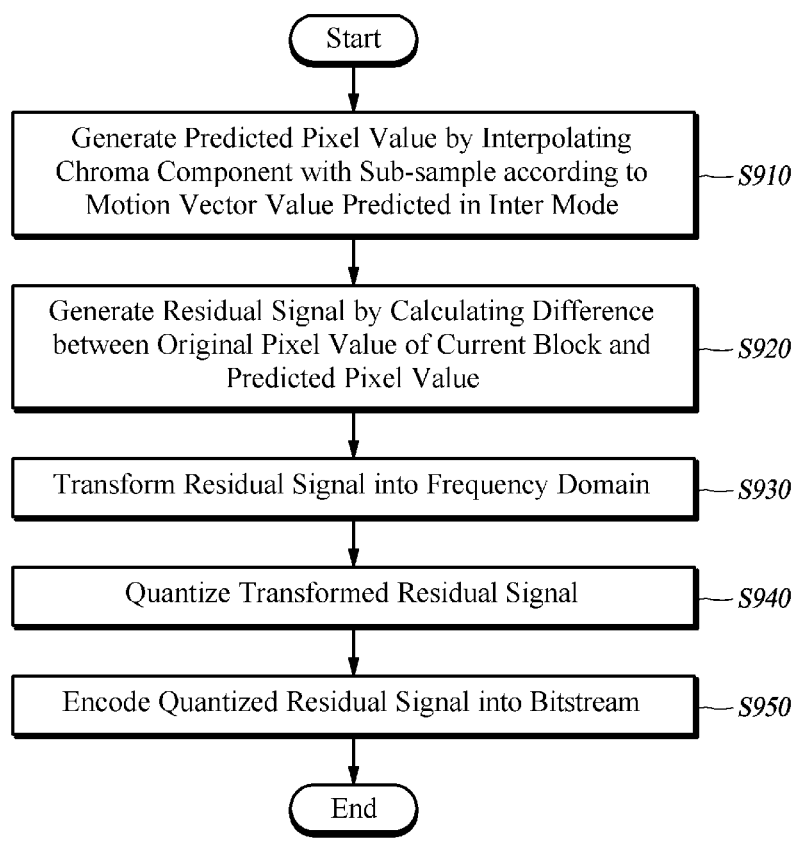
FIG. 9 is a flow chart of a video encoding method according to at least one embodiment of the present disclosure.

FIG. 9 is a flow chart of a video encoding method according to at least one embodiment of the present disclosure.

The video encoding apparatus 600 encodes a video by performing a prediction step S910 for generating a sub-sample prediction value of a chroma component by using a motion vector value of a luma component in a current block of a video. The video encoding apparatus 600 further performs a subtraction step S920 for generating a residual signal by calculating a difference between an original pixel value of the current block and a predicted pixel value. The video encoding apparatus 600 further performs a transform step S930 for transforming a generated residual signal into frequency domain by using a DCT transform or a wavelet transform. The video encoding apparatus 600 further performs a quantization step S940 for quantizing the residual signal transformed into the frequency domain. The video encoding apparatus 600 further performs an encoding step S950 for encoding a quantized frequency transform residual signal into a bitstream.

Since the prediction step S910, subtraction step S920, transform step S930, quantization step S940 and encoding step S950 correspond to the functions of the prediction unit 610, subtraction unit 620, transform unit 630, quantization unit 640 and encoding unit 650, respectively, detailed descriptions thereof are omitted.

Figure 10:
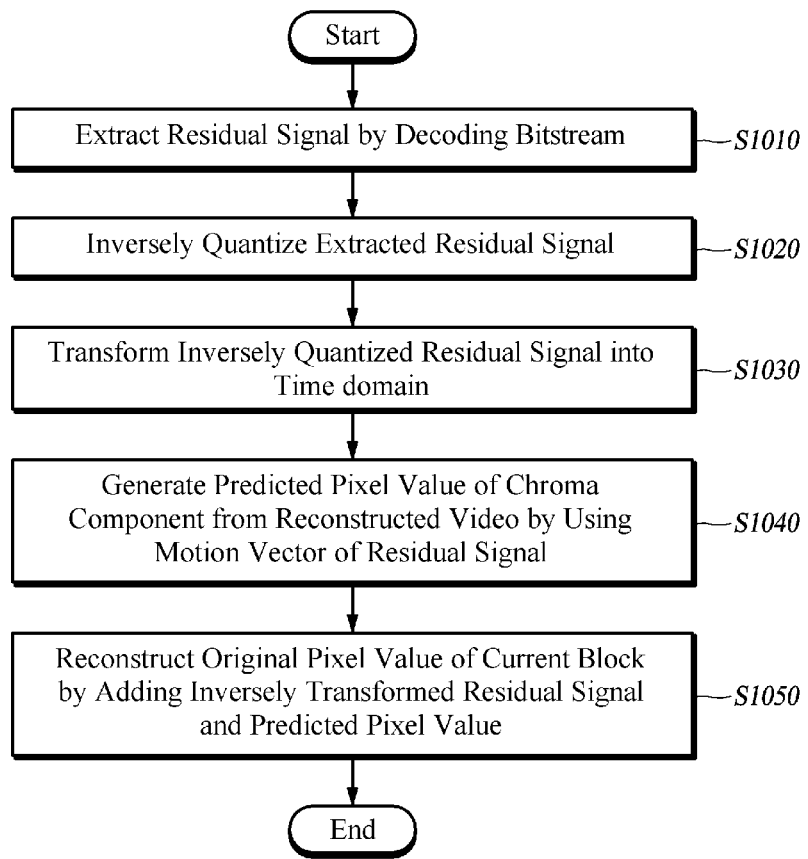
FIG. 10 is a flow chart of a video decoding method according to at least one embodiment of the present disclosure.

FIG. 10 is a flow chart of a video decoding method according to at least one embodiment of the present disclosure.

The video decoding apparatus 800 receiving and storing the bitstream of the video through a wired/wireless communication network or cable reconstructs a current block of a video by generating a sub-sample prediction value of a chroma component by using a motion vector value of a luma component and decoding the video, so as to reconstruct a video in accordance with a user's selection or an algorithm of other running program.

The video decoding apparatus 800 decodes a received bitstream by performing a decoding step S1010 for decoding a bitstream to extract a quantized frequency transform residual signal representing information of a pixel value of a current block of a video. The video decoding apparatus 800 further performs an inverse quantization step S1020 for inversely quantizing the quantized frequency transform residual signal. The video decoding apparatus 800 further performs an inverse transform step S1030 for inversely transforming an inversely quantized frequency transform residual signal into time domain. The video decoding apparatus 800 further performs a prediction step S1040 for generating a sub-sample prediction value of a chroma component by using a motion vector value of a luma component from a prediction value of a current block represented by the residual signal reconstructed by the inverse transform into time domain. The video decoding apparatus 800 further performs an addition step S1050 for reconstructing an original pixel value of a current block by adding the residual signal of the current block reconstructed in step S1030 and the predicted pixel value of each pixel of the current block predicted in step S1040.

Since the decoding step S1010, inverse quantization step S1020, inverse transform step S1030, prediction step S1040 and addition step S1050 correspond to the operations of the decoding unit 810, inverse quantization unit 820, inverse transform unit 830, prediction unit 850 and addition unit 840, respectively, detailed descriptions thereof are omitted.

The video encoding/decoding method according to one or more embodiments of the present disclosure is realized by a combination of the video encoding method according to one or more embodiments of the present disclosure and the video decoding method according to one or more embodiments of the present disclosure.

The video encoding/decoding method according to at least one embodiment of the present disclosure includes a video encoding step for generating a prediction block of a chroma component from a value obtained by interpolating a sub-sample value of a chroma component of a reference block which is referenced by a motion vector of a luma component of a current block, by using an FIR filter and linear interpolation. The video encoding step further includes generating a residual block by subtracting the prediction block from the chroma component of the current block, and generating a quantized frequency-transformed block by transforming and quantizing the residual block. The video encoding step further includes encoding the quantized frequency-transformed block into a bitstream. The method step further includes a video decoding step for generating a quantized frequency-transformed block from a bitstream. The video decoding step further includes reconstructing a residual block by inversely quantizing and inversely transforming the quantized frequency-transformed block. The video decoding step further includes generating a prediction block of a chroma component from a value obtained by interpolating a sub-sample value of a chroma component of a reference block which is referenced by a motion vector of a chroma component of a current block to be reconstructed, by using an FIR filter and linear interpolation. The video decoding step further includes reconstructing the current block by adding the reconstructed residual block and the generated prediction block.

The video encoding step is implemented with the video encoding step according to one or more embodiments of the present disclosure, and the video decoding step is implemented with the video decoding step according to one or more embodiments.

According to at least one embodiment of the present disclosure as described above, a difference between an actual block and a predicted block is reduced by more accurately interpolating a current block to be encoded, thereby improving encoding efficiency. Therefore, a video is effectively reconstructed by improving compression efficiency of the current block and decoding a block transformed into a bitstream in consideration of an encoding method.

In the description above, although the components of the embodiments of the present disclosure are explained as assembled or operatively connected as a unit, the present disclosure is not intended to limit itself to such embodiments. Rather, within the objective scope of the present disclosure, the respective components are selectively and operatively combined in any numbers. Every one of the components are also implemented in hardware while the respective ones are combined in part or as a whole selectively and implemented in a computer program having program modules for executing functions of the hardware equivalents. Codes or code segments to constitute such a program are easily deduced by a person skilled in the art. The computer program is stored in computer readable media, which in operation realizes the embodiments of the present disclosure. The computer readable media include magnetic recording media, optical recording media, and carrier wave media.

Although exemplary embodiments of the present disclosure have been described for illustrative purposes, those skilled in the art will appreciate that various modifications, additions and substitutions are possible, without departing from essential characteristics of the disclosure. Therefore, exemplary embodiments of the present disclosure have not been described for limiting purposes. Accordingly, the scope of the disclosure is not to be limited by the above embodiments but by the claims and the equivalents thereof.

The invention claimed is:

1. A video decoding apparatus comprising:
a decoding unit configured to extract a quantized frequency-transformed block from a bitstream;
an inverse quantization unit configured to reconstruct a frequency-transformed block based on inversely quantizing the quantized frequency-transformed block;
an inverse transform unit configured to reconstruct a residual block based on inversely transforming the frequency-transformed block;
a prediction unit configured to generate a prediction block based on interpolating chroma sub-samples of a reference block referenced by a motion vector of a current block; and
an addition unit configured to reconstruct the current block based on adding the reconstructed residual block and the prediction block,
wherein the prediction unit is configured to
calculate non-divided values of a first set of sub-samples by multiplying chroma integer-pixels by integer numerators and summing the multiplied chroma integer-pixels,
derive the first set of sub-samples by dividing the non-divided values by a common denominator, and
derive a second set of sub-samples by interpolation from the non-divided values of the first set of sub-samples, not from the first set of sub-samples which have been divided by the common denominator, and then division by the common denominator.

2. The video decoding apparatus of claim 1, wherein the prediction unit is configured to generate the chroma sub-samples of the reference block using a finite impulse response (FIR) filter.

3. The video decoding apparatus of claim 2, wherein the FIR filter is a filter with 4 or more taps for calculating values of the sub-samples, based on four or more chroma integer-pixels.

4. The video decoding apparatus of claim 1, wherein the prediction unit is configured to interpolate up to a position of a ⅛ sub-sample of a chroma component.

5. A video decoding method comprising:

generating a quantized frequency-transformed block from a bitstream;

reconstructing a frequency-transformed block by inversely quantizing the quantized frequency-transformed block;

reconstructing a residual block by inversely transforming the frequency-transformed block;

generating a prediction block based on interpolating chroma sub-samples of a reference block referenced by a motion vector of a current block; and reconstructing the current block by adding the reconstructed residual block and the prediction block, wherein the interpolating of the chroma sub-samples comprises:

calculating non-divided values of a first set of sub-samples by multiplying chroma integer-pixels by integer numerators and summing the multiplied integer-pixels;

deriving the first set of sub-samples by dividing the non-divided values by a common denominator, when deriving the first set of sub-samples; and deriving a second set of sub-samples by interpolation from the non-divided values of the first set of sub-samples, not from the first set of sub-samples which have been divided by the common denominator, and then division by the common denominator, when deriving the second set of sub-samples.

6. The video decoding method of claim 5, wherein the chroma sub-samples are generated by using a finite impulse response (FIR) filter.

7. The video decoding method of claim 6, wherein the sub-samples are generated by the FIR filter with 4 or more taps for calculating values of the sub-samples, based on four or more integer-pixels.

8. The video decoding method of claim 5, wherein the chroma sub-samples are interpolated up to a position of a ⅛ sub-sample.

* * * * *